(12) United States Patent
Mueller et al.

(10) Patent No.: US 6,513,760 B1
(45) Date of Patent: Feb. 4, 2003

(54) LOGISTICS MODULE SYSTEM AND METHOD

(75) Inventors: George E. Mueller, Kirkland, WA (US); Richard H. Kohrs, Kirkland, WA (US); David B. Cochran, Bellevue, WA (US); Joseph W. Cuzzupoli, Kirkland, WA (US); Charles D. Limerick, Issaquah, WA (US); Richard A. Bailey, Canyon Country, CA (US); Thomas G. Johnson, Bellevue, WA (US); Steven C. Knowles, Puyallup, WA (US)

(73) Assignee: Kistler Aerospace Corporation, Kirkland, WA (US)

( * ) Notice: Subject to any disclaimer, the term of this patent is extended or adjusted under 35 U.S.C. 154(b) by 0 days.

(21) Appl. No.: 09/735,201

(22) Filed: Dec. 11, 2000

Related U.S. Application Data

(60) Provisional application No. 60/170,749, filed on Dec. 14, 1999.

(51) Int. Cl.[7] ................................................. F03H 5/00
(52) U.S. Cl. ..................... 244/172; 244/158 R; 244/161
(58) Field of Search ................................ 244/161, 172, 244/158 R

(56) References Cited

U.S. PATENT DOCUMENTS

| | | | |
|---|---|---|---|
| 2,977,080 A | | 3/1961 | Von Zborowski |
| 3,168,266 A | | 2/1965 | Yost |
| 3,260,204 A | | 7/1966 | Wilkey, Jr. |
| 3,286,629 A | | 11/1966 | Laue |
| 3,304,724 A | | 2/1967 | Blumrich et al. |
| 4,449,684 A | * | 5/1984 | Hinds .......................... 295/39 |
| 4,451,017 A | | 5/1984 | Marshall |
| 4,664,344 A | * | 5/1987 | Harwell et al. ............. 244/161 |
| 4,796,839 A | | 1/1989 | Davis |
| 4,834,325 A | * | 5/1989 | Faget et al. ................. 136/245 |
| 4,896,848 A | * | 1/1990 | Ballard et al. ........... 244/158 R |
| 4,955,654 A | * | 9/1990 | Tsuchihashi et al. ........ 244/161 |
| 4,964,596 A | * | 10/1990 | Ganssle et al. .......... 244/158 R |
| 5,145,227 A | * | 9/1992 | Monford, Jr. ................ 244/161 |
| 5,735,488 A | * | 4/1998 | Schneider ............... 244/158 R |
| 5,927,653 A | | 7/1999 | Mueller et al. |
| 6,059,234 A | | 5/2000 | Mueller et al. |
| 6,082,676 A | | 7/2000 | Cochran |
| 6,113,032 A | | 9/2000 | Cochran et al. |
| 6,193,193 B1 | * | 2/2001 | Soranno et al. ......... 244/158 R |

OTHER PUBLICATIONS

Mr. Toru Yoshihara, "Common Berthing Mechanism Acceptance Test of the Japanese Experiemtn Module "Kibo"", Sep. 2000, al pp. 1–3.*
Common Berthing Mechanism to Pressurized Elements Interface Control Document Part 1, Jun. 1, 1999, National Aeronautics and Space Administration.I.*

* cited by examiner

*Primary Examiner*—Charles T. Jordan
*Assistant Examiner*—Stephen A. Holzen
(74) *Attorney, Agent, or Firm*—Christensen O'Connor Johnson Kindness PLLC

(57) ABSTRACT

An orbital vehicle (34) having a propulsion module (33) and a logistics module (36). The logistics module includes a generally cylindrical outer shell (56, 541, 542) with first and second ends. An openable cover (58) is coupled with the outer shell at the first end, thereby providing access to the interior of the logistics module. The second end is adapted to couple to the propulsion module. A cargo container (54) is disposed generally within the outer shell, the cargo container including a berthing mechanism (70) disposed to be accessible when the cover is opened. A retractable grapple fixture (176) is provided on the logistics module, selectively positionable between an extended position and a retracted position. When the grapple fixture is in the extended position a grapple shaft (78) can be accessed to secure the orbital vehicle. When the grapple fixture is retracted, it is enclosed within the orbital vehicle.

14 Claims, 9 Drawing Sheets

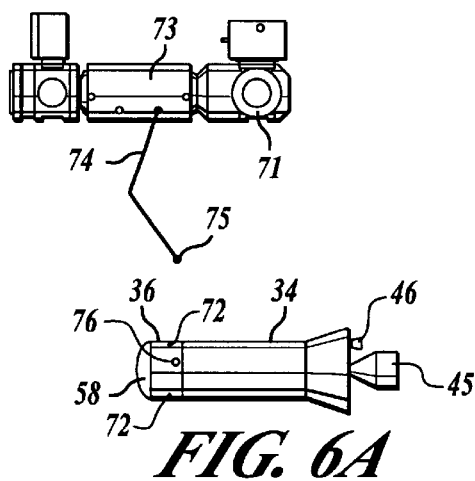
FIG. 6A
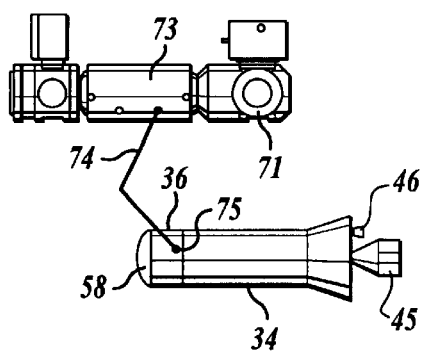
FIG. 6B
FIG. 6C
FIG. 6D
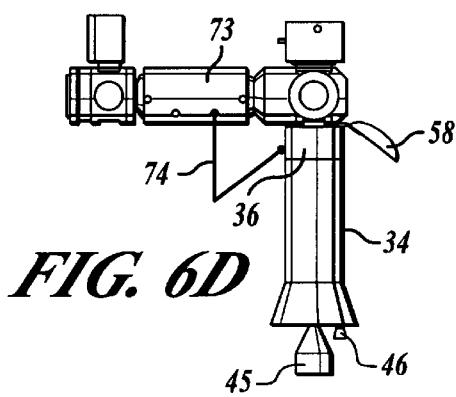
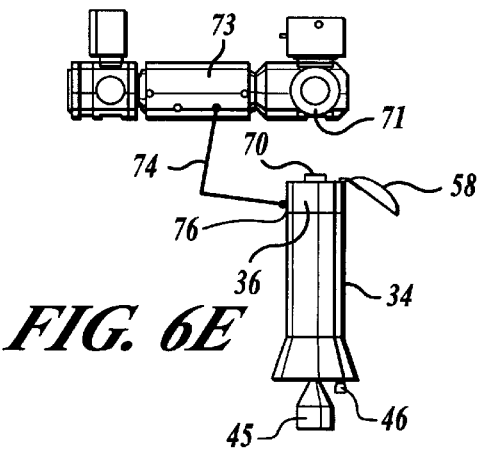
FIG. 6E
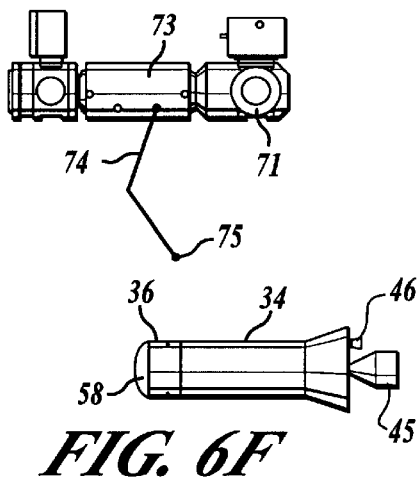
FIG. 6F

LOGISTICS MODULE SYSTEM AND METHOD

CROSS-REFERENCE TO RELATED APPLICATIONS

This application claims the benefit of the filing of U.S. Provisional Patent Application No. 60/170,749, entitled ISS LOGISTICS MODULE, filed on Dec. 14, 1999, and the specification thereof is incorporated herein by reference.

FIELD OF THE INVENTION

The present invention relates to aerospace vehicles and, in particular, to a logistics module system and method.

BACKGROUND OF THE INVENTION

Multistage aerospace vehicles are widely used to carry payloads into orbit. Typical payloads may include astronauts, satellites, orbital experiments, supplies, and/or extra-orbital vehicles. Typically, one or more non-orbital booster stages accelerate an orbital vehicle toward a desired orbital velocity and altitude. The orbital vehicle typically includes one or more logistics module or cargo vessel containing the payload that is to be delivered to orbit. During the launch sequence the depleted booster stage(s) are separated from the orbital vehicle and jettisoned, thereby reducing the weight and aerodynamic drag of the aerospace vehicle, and allowing the upper stage(s) to ignite and operate using a rocket nozzle that is more efficient at the higher operating altitude.

In prior art launch vehicles, the depleted booster stage(s) falls back toward the Earth, perhaps burning up on reentry or plunging into the ocean. It is very expensive, however, to put a payload into orbit. Most aerospace vehicles are designed for a single use, delivering a payload to the desired orbit, and then eventually being destroyed upon reentry into the atmosphere. Single-use launch vehicles require that each payload undertake the entire cost of the launch vehicle, in addition to the cost of the payload. A notable and highly successful exception has been the U.S. Space Transportation Systems, comprising a fleet of Space Shuttles. The Space Shuttle utilizes a pair of recoverable solid rocket boosters, and a reusable manned shuttle that is capable of reentering the atmosphere and gliding to a controlled landing. An expendable external fuel tank is used during the launch phase. Notwithstanding the advantages provided by the space shuttle, the cost of putting a payload into orbit remains high.

Meanwhile, the need for orbit-capable launch vehicles is increasing. For example, there is a growing need for aerospace vehicles that are capable of delivering payloads to orbiting space facilities, such as the International Space Station. Such aerospace vehicles may also be used to remove cargo, refuse, experiments, and other materials from the orbiting space facility.

There is therefore a need for a lower-cost, recoverable aerospace vehicle that is capable of carrying payloads into Earth orbit. Recoverability, and recoverable cargo capacity, are key attributes of the K-1 reusable launch vehicle system.

SUMMARY OF THE INVENTION

An object of the present invention is to reduce the cost of delivering payloads into Earth orbits. Another object is to provide a recoverable and reusable logistics module that can be used to simplify the transfer of payload between the logistics module and an orbital space station such as the International Space Station.

The foregoing objects are attained in accordance with the present invention by employing a logistics module having a cylindrical outer shell with an openable cover assembly on one end. The openable cover may be automatically opened, displaced, and replaced while the logistics module is in orbit. The other end of the logistics module is adapted to mate with a propulsion module. A cargo container is at least partially disposed within the logistics vehicle.

In an aspect of a preferred embodiment, the logistics module includes a retractable grapple fixture. The grapple fixture includes a base plate with a grapple shaft. The grapple shaft is enclosed within the outer shell when the grapple fixture is in a retracted position, and extends outwardly, generally perpendicular to the outer shell, when the grapple fixture is in an extended position.

In another aspect of a preferred embodiment, the logistics module includes a pressurized cargo container capable of maintaining a pressure of approximately 10–14 psia and having a volume of about 30 cubic meters.

Other technical advantages are readily apparent to one skilled in the art from the following figures, description, and claims.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A–6F illustrate a sequence of operation that uses the orbital vehicle depicted in FIG. 1 to deliver supplies to a space station.

DETAILED DESCRIPTION OF THE PREFERRED EMBODIMENT

Figure 1:
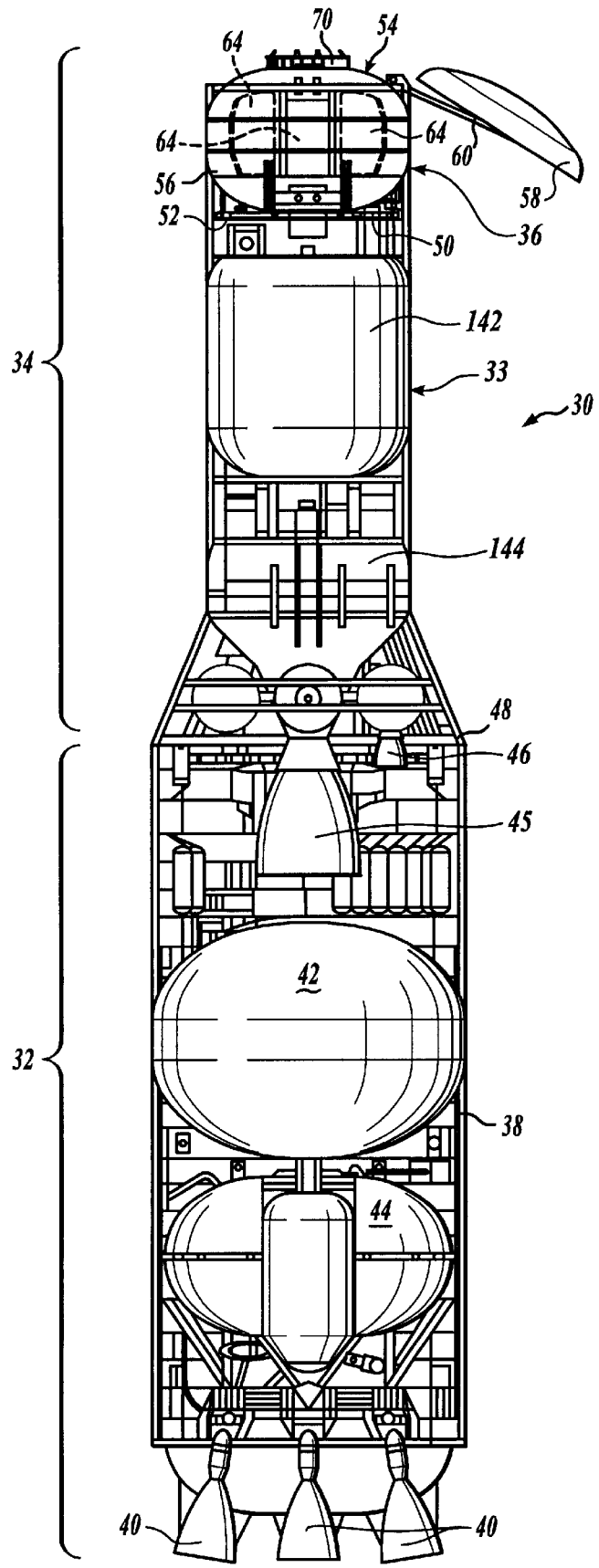
FIG. 1 is a side elevational view of a launch vehicle embodying the present invention that includes a launch assist platform and an orbital vehicle including a logistics module.

Referring to FIG. 1, a launch vehicle 30 is illustrated which includes a first stage launch assist platform 32, and a second stage orbital vehicle 34 having a lower propulsion module 33 and an upper logistics module 36. In a preferred embodiment, the logistics module 36 includes a cargo container 54, which may be pressurized or unpressurized depending on the needs of a particular mission. The launch vehicle 30 may be used, for example, to deliver a payload, such as cargo or one or more satellites, to an Earth orbit. The orbital vehicle 34 also includes an orbital maneuvering system (OMS) 46 that enables the orbital vehicle 34 to perform inter-orbital maneuvers—for example, to rendezvous with a space station or another space vehicle—and, upon completion of a mission, to de-orbit and return to Earth. In one typical mission, for example, the launch vehicle 30 may be used to deliver. supplies and other cargo to a space station, such as the International Space Station, and if desired, remove cargo, refuse, and other materials from the space station for return to Earth.

Figure 7:
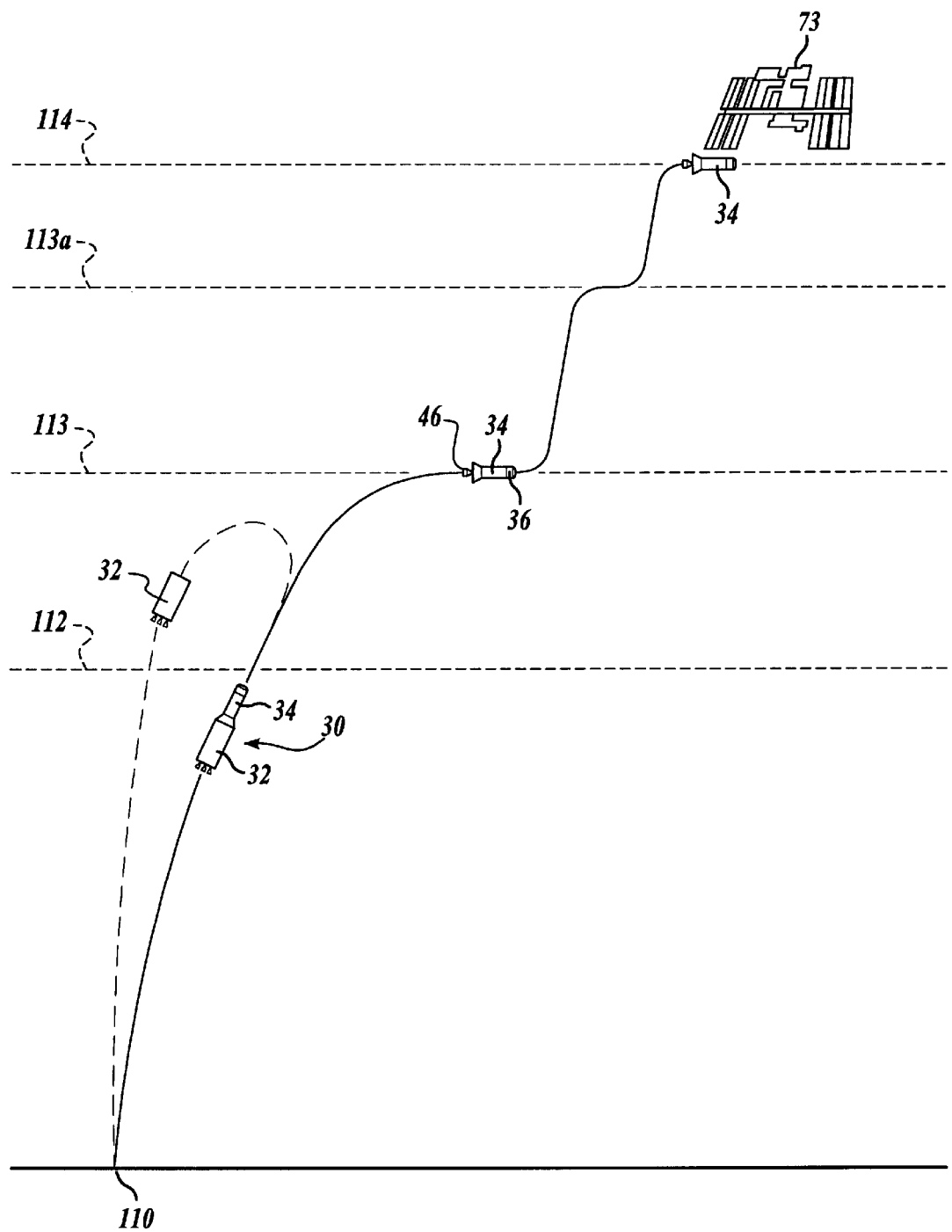
FIG. 7 is a graphical illustration of a flight profile of the launch vehicle depicted in FIG. 1.

The launch assist platform 32 of the preferred embodiment includes a generally tubular structural outer shell 38. To maximize the strength-to-weight ratio of the outer shell 38, it is preferably constructed in major part of advanced composite materials such as graphite fiber-reinforced plastics. The launch assist platform 32 includes one or more main propulsion engines 40. In a particular embodiment shown in FIG. 1, three main propulsion engines 40 are used that utilize liquid oxygen (LOX) and kerosene propellant. Different engine configurations and designs are also contemplated by the present invention including, for example, engines that utilize hydrogen as a propellant. A LOX tank 42 and fuel tank 44 are disposed above the main propulsion engines 40. In one embodiment, the vertical walls of the LOX tank 42 form a part of the outer shell 38. Liquid oxygen stored in the LOX tank 42 and propellant stored in the fuel tank 44 are supplied to the main propulsion engines 40 where they are combined and ignited to provide thrust during take-off and throughout the first launch stage, to first stage separation 112 (FIG. 7).

The orbital vehicle 34 and the launch assist platform 32 are releasably coupled to each other at their juncture 48. During the first stage of the launch, the main propulsion engines 40 provide the thrust necessary to achieve lift-off and propel the launch vehicle 30 to a pre-determined elevation and trajectory. A separation system (not shown) is then activated to decouple the orbital vehicle 34 from the launch assist platform 32. In a preferred embodiment, the launch assist platform 32 recoverably returns to Earth for refurbishment and reuse. Stage separation systems are well known in the art, and any suitable system, including for example, an explosive bolt system, may be used in the present invention.

After the launch assist platform 32 separates from the orbital vehicle 34, a second stage main engine 45 engages, and propels the orbital vehicle 34 to a desired main engine cutoff orbit 113 (FIG. 7) and then shuts off. In the preferred embodiment, the second stage main engine is fueled with propellant contained in an orbital vehicle liquid oxygen tank 142 and propellant tank 144. The orbital vehicle 34 includes an OMS system 46 for effecting orbital transfers. The OMS 46 transfers the orbital vehicle 34 from the main engine cutoff orbit 113 to a desired location and orbit. For example, in one application discussed in more detail below, the orbital maneuvering system 46 transfers the orbital vehicle 34 into an orbit adjacent to a space station. Throughout this specification, the term "space station" includes any structure or vehicle located outside of Earth's atmosphere including, but not limited to, the International Space Station, a space hotel, a Mars vehicle, or other orbital structure.

Referring now to FIGS. 1 and 2A–2C, the logistics module 36 is attached to the propulsion module 33 of the orbital vehicle 34 at the interface 52. The attachment hardware 50 may be of any conventional design. In a preferred embodiment the logistics module 36 is removably attachable to the propulsion module 33, to facilitate ground assembly of the orbital vehicle 34. This preferred embodiment allows the logistics module 36 to be separated from the propulsion module 33, for example, after the orbital vehicle returns to Earth, for refurbishment and installation on a second propulsion module, or other vehicle. It is also contemplated by this invention, however, that weight considerations or other mission constraints may require a unitary orbital vehicle 34, wherein the logistics module 36 is not separable from the propulsion module 33.

In a preferred embodiment, the orbital vehicle 34, including the logistics module 36, is covered on its exterior surface with a thermal protection material (not shown) such as the Advanced Flexible Reusable Surface Insulation (AFRSI) blankets used on the Space shuttle. AFRSI consists of a low-density fibrous silica batting that is made up of high-purity silica and 99.8-percent amorphous silica fibers. The batting is sandwiched between an outer woven silica high-temperature fabric and an inner woven glass lower temperature fabric. After the composite is sewn with silica thread, it has a quilt-like appearance. The AFRSI blankets are coated with a ceramic colloidal silica and high-purity silica fibers that provide endurance. The AFRSI composite density is approximately 8 to 9 pounds per cubic foot and varies in thickness from 0.45 to 0.95 inch. The thickness is determined by the heat load the blanket encounters during entry. After completing its mission, the orbital vehicle 34 is recoverably returned to Earth, refurbished, and reused on subsequent flights, for example, by the method described in U.S. Pat. No. 6,076,771.

The logistics module 36 includes a forward end 35, an aft end 37, and an integral cargo container 54. In a preferred embodiment, the cargo container 54 is pressurizable, typically to about 10–14.7 psia. The cargo container 54 is generally spheroidal in shape, having an upper dome portion 561, a cylindrical center wall portion 56, and a lower dome portion 562, which cooperatively define an enclosed cargo volume. The center wall portion 56 forms a portion of the outer structural surface of the logistics module 36. An upper cylindrical skirt 541 and a lower cylindrical skirt 542 extend vertically from the cargo container 54, coaxially with the center wall 56, to cooperatively form the outer structural wall of the logistics module 36, as seen most clearly in FIG. 2A.

In one embodiment, the logistics module 36 also includes a low thrust, cold gas attitude control system, having a plurality of attitude control system thrusters 72 which provide a coordinated and controlled means for maneuvering the orbital vehicle 34, particularly when it is in close proximity to the space station 73 (FIG. 6).

A selectively openable cover 58 is attached to the upper cylindrical skirt 541.

Figure 2A:
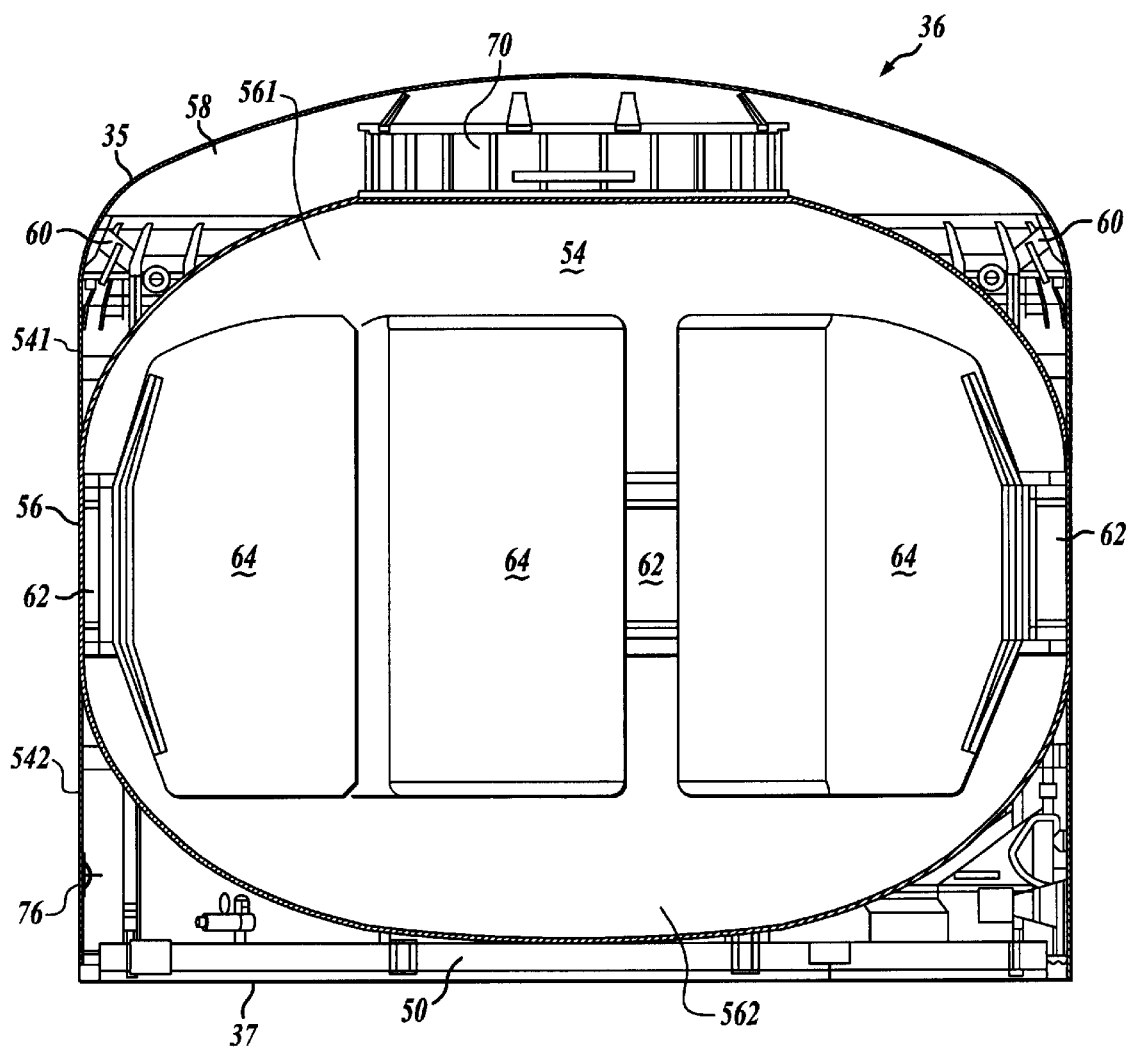
FIG. 2A is a partial cross-section, with portions broken away, illustrating the logistics module depicted in FIG. 1.
Figure 2B:
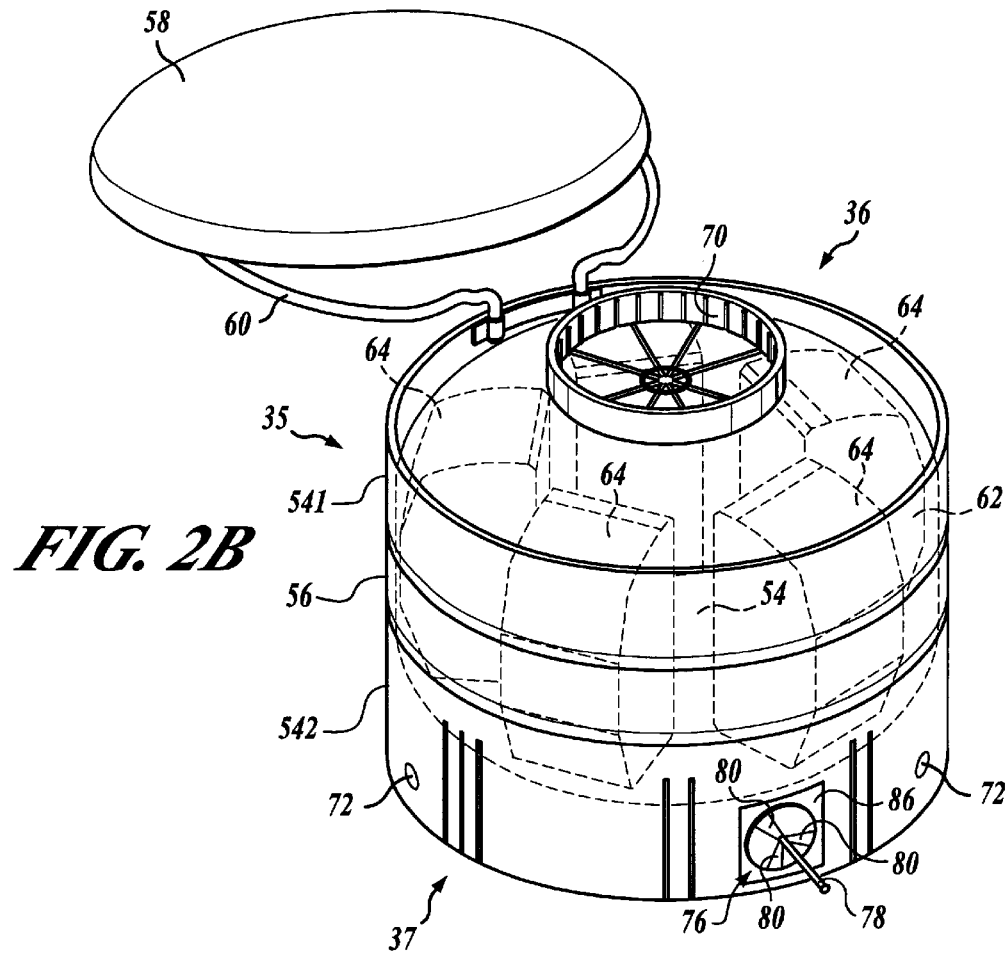
FIG. 2B is a perspective view of the logistics module depicted in FIG. 2A, illustrating the cover in an open position and showing a grapple fixture.

As shown in FIGS. 2A and 2B, the cover 58 can be opened and displaced away from the upper cylindrical skirt 541, to provide access to the cargo container 54.

The logistics module 36 includes cover hardware 60 that secures the cover 58 to the logistics module 36, and moves the cover 58 between an open and a closed position. In the closed position shown in FIG. 2A, the cover 58 is tightly secured to the upper cylindrical skirt 541, cooperatively forming a continuous exterior surface that physically and thermally protects the cargo container 54 during launch and re-entry. When the orbital vehicle is in orbit, the cover 58 can be remotely opened and displaced to provide access to the cargo container 54. After the cargo transfer is completed, the cover 58 is returned to the closed position to protect the cargo container 54 during re-entry. In a preferred embodiment, the cover 58 and cover hardware 60 include an actuator mechanism that allows the cover 58 to be remotely and/or automatically activated to move the cover 58 between the open and closed positions.

A support structure 62 is provided inside the cargo container 54 for securing the cargo to the cargo container 54. In a preferred embodiment the support structure 62 is adapted to secure five payload racks 64, such as International Standard Payload Racks, within the cargo container 54, although other types of payloads perhaps requiring different support structure are also contemplated by the present invention. International Standard Payload Racks conform to a standard adopted by NASA and are particularly suitable for delivering payloads to the International Space Station. Alternatively, the payload racks 64 may be designed to accommodate any type of pressurized or non-pressurized solids, liquids, or gases.

Figure 2C:
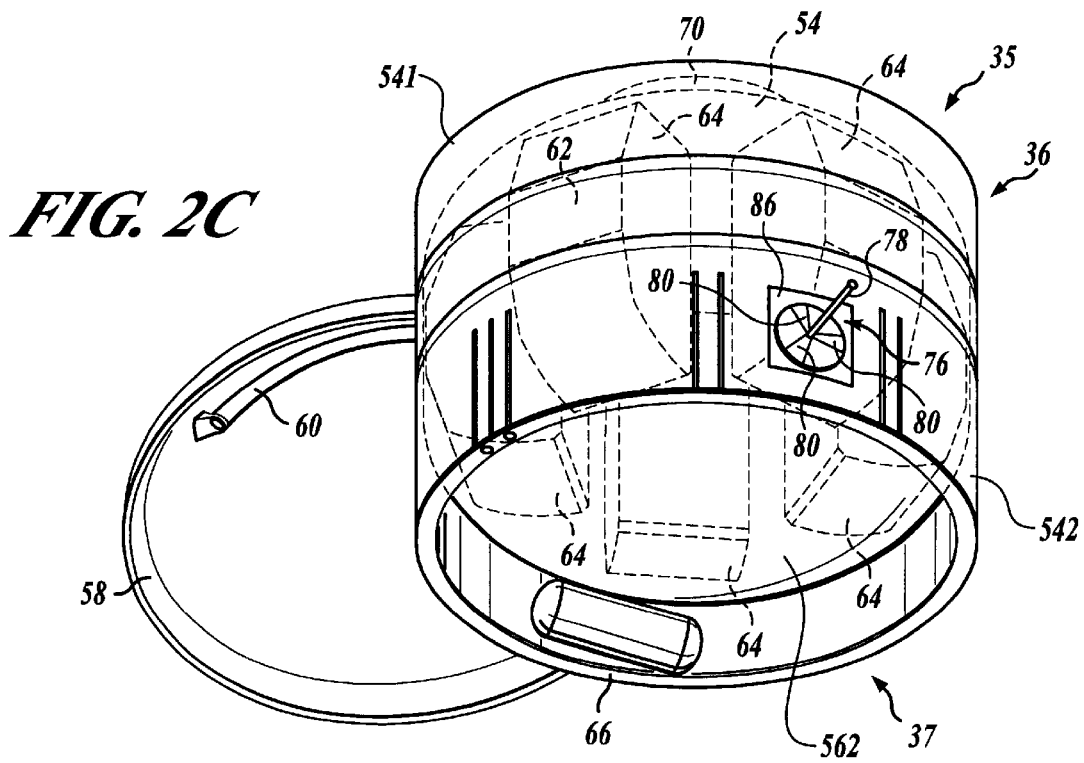
FIG. 2C is a perspective view of the logistics module depicted in FIG. 2A from a point generally below the logistics module.

The logistics module 36 may also include a plurality of mounting and tie down structures for supporting various additional or secondary payloads, which may be located inside or outside of the cargo container 54. For example, as shown in FIG. 2C, the logistics module 36 may include one or more GN2 (gaseous nitrogen) bottles 66, which may be used as part of a cold gas attitude control system. Other possible payloads that might be installed externally from the cargo container 54 include avionics pallets and scientific experiment platforms, such as microgravity experimental apparatus (not shown). An avionics pallet may be configured, for example, to secure various cargos including star trackers, proximity sensors, batteries, and mechanism controllers.

In one embodiment, the logistics module 36 will accommodate the mass equivalent of two International Standard Payload Racks (ISPRs) and up to two equivalent racks-for example, additional mid-deck locker equivalent racks, gases, or water. In another embodiment depicted in FIG. 2B, five payload racks 64 are secured to the support structure 62 in the cargo container 54, spaced around the interior perimeter of the center wall 56, leaving an open, central area to facilitate the unloading and loading of the cargo between the logistics module 36 and a space station.

Figure 5:
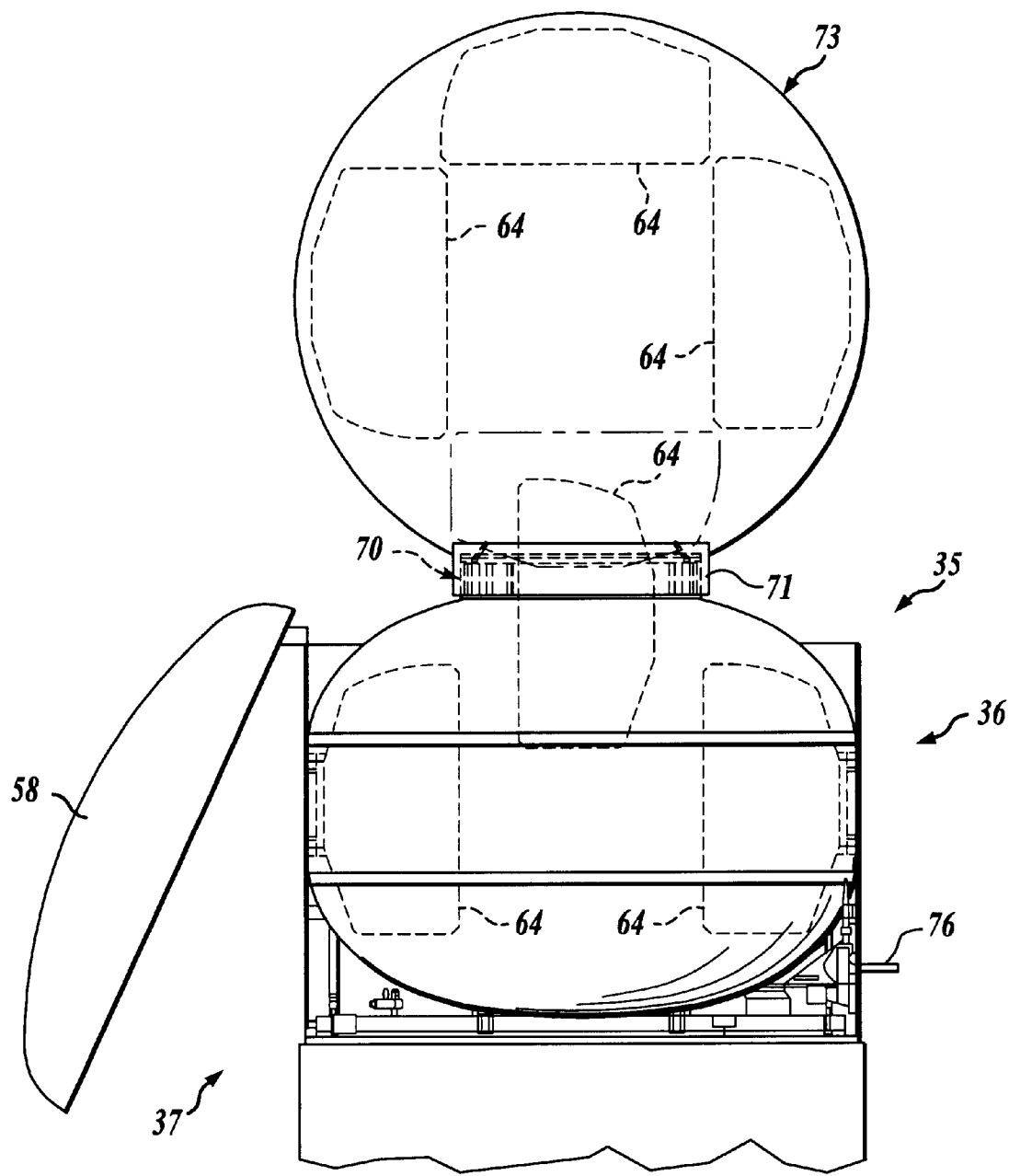
FIG. 5 is a generally schematic side elevation view of the logistics module depicted in FIG. 1 berthed with a space station.

In order to transfer the payload from the cargo container 54 to a space station or other vehicle, the cover 58 is moved to the open position, and displaced laterally from the upper cylindrical skirt 541 to expose the cargo container 54. A berthing mechanism 70 is provided in the upper dome portion 561 of the cargo container 54. In a preferred embodiment, the berthing mechanism 70 is a passive portion of the standard Common Berthing Mechanism. The Common Berthing Mechanism is a NASA-adopted standard berthing system, comprising a passive mechanism and an active mechanism, that is used to connect components and vehicles to the International Space Station 73 (FIG. 5). The passive Common Berthing Mechanism 70 is configured to couple to a complementary active Common Berthing Mechanism 71 (FIG. 5) associated with the space station 73. The mated berthing mechanisms 70 and 71 form an openable port to transfer payload between the logistics module 36 and the space station 73. The interface between the berthing mechanism 70 and the space station's berthing mechanism 71 forms a tight seal in order to maintain pressurized protection of the space station and the cargo container 54. After berthing, the contents of the cargo container 54 may be transferred to the space station 73 by hand or through the use of a robotic system.

The logistics module 36 also includes a retractable grapple fixture 76. In a preferred embodiment, the grapple fixture 76 is a Flight Releasable Grapple Fixture, a standard fixture adopted by NASA and used extensively with the International Space Station. In this embodiment, the grapple fixture 76 interfaces with the Space Station Remote Manipulator System (FIG. 6), a remotely controlled external arm 74 having a latching end effector 75 at each end that is compatible with the flight releasable grapple fixture 76. The latching end effector 75 engages the grapple fixture 76 to couple the external arm 74 to grapple fixture 76.

As best seen in FIGS. 3A–3D, the grapple fixture 76 includes a grapple shaft 78 which extends from a base plate 86, and a plurality of interface arms 80 that interface with complementary elements in the latching end effector 75 (FIG. 6). A unique aspect of the present invention is that the grapple fixture 76 is retractable. The retractable grapple fixture 76 can be moved between an extended position (FIG. 3B) wherein the grapple shaft 78 is disposed outwardly from the logistics module 36, and a retracted position (FIG. 3D) wherein the grapple shaft 78 is contained entirely within the logistics module 36. The base plate 86 secures the interface arms 80 and the grapple shaft 78 to a section of thermally insulated side wall 88. When the grapple fixture 76 is in its extended position, the thermally insulated side wall 88 forms a continuous seal with adjacent sections of lower cylindrical skirt 542. A movable portion 57 of the lower cylindrical skirt 542 is disposed inside thermally insulated side wall 88 when the grapple fixture 76 is in its extended position. In the retracted position (FIG. 3D) the grapple shaft 78 is disposed inside the logistics module 36 and the movable portion 57 of the lower cylindrical skirt 542 mates with the remainder of the lower cylindrical skirt 542.

The grapple fixture 76 also includes a grapple target 84 that provides a visible indicator for a human operator at the space station. As the robotic arm 74 and latching end effector 75 approach the grapple fixture 76, the grapple target 84 provides a benchmark location which allows the remote manipulator system 74 to position itself such that the latching end effector 75 can engage the grapple shaft 78.

The base plate 86, thermally insulated side wall 88, and movable portion 57 of the logistics module wall are pivotally connected to a support bracket 90 which extends between a pair of collars 92 to support the grapple fixture 76. Each collar 92 is coupled with a retractable support arm 96. The retractable support arms 96 are slidably coupled with a housing 100, which allows the extension and retraction of the retractable grapple fixture 76 with respect to logistics module 36.

Figure 3A:
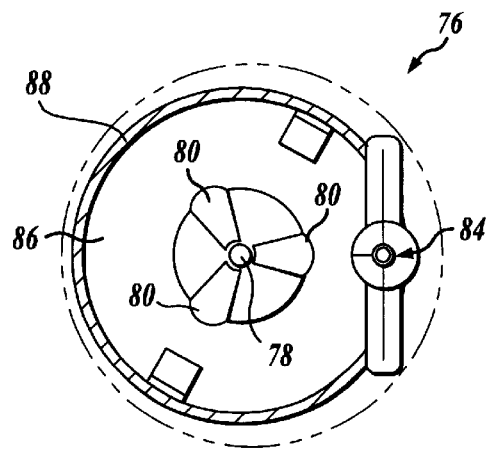
FIG. 3A is a generally schematic plan view illustrating a retractable grapple fixture for the logistics module depicted in FIG. 1.
Figure 3B:
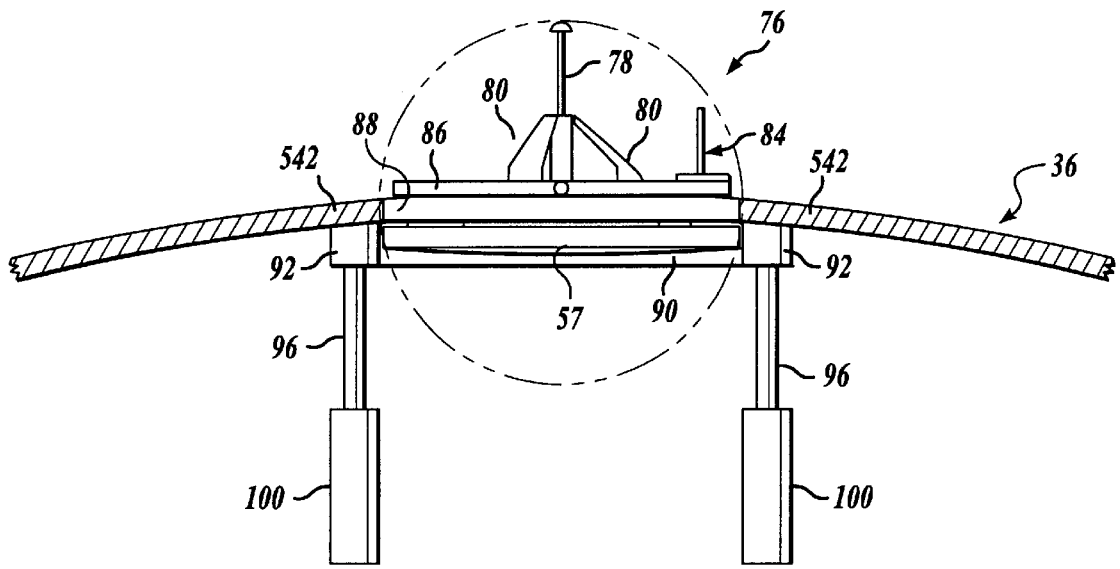
FIG. 3B is a partial cross-section view with portions broken away, illustrating the retractable grapple fixture depicted in FIG. 3A in an extended position.
Figure 3C:
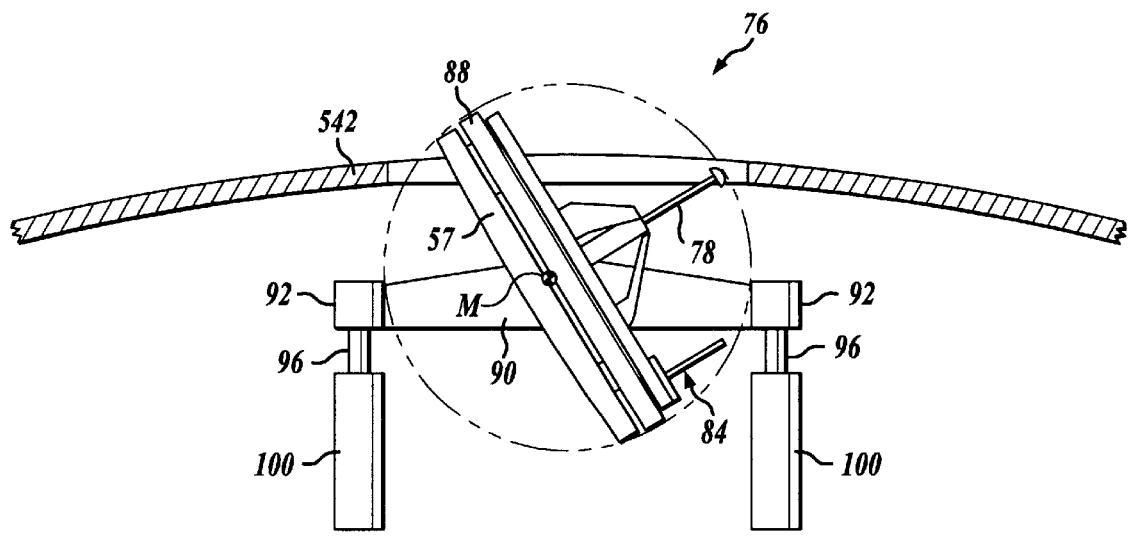
FIG. 3C is a partial cross-section view, with portions broken away, illustrating the retractable grapple fixture depicted in FIG. 3A in a partially retracted position.
Figure 3D:
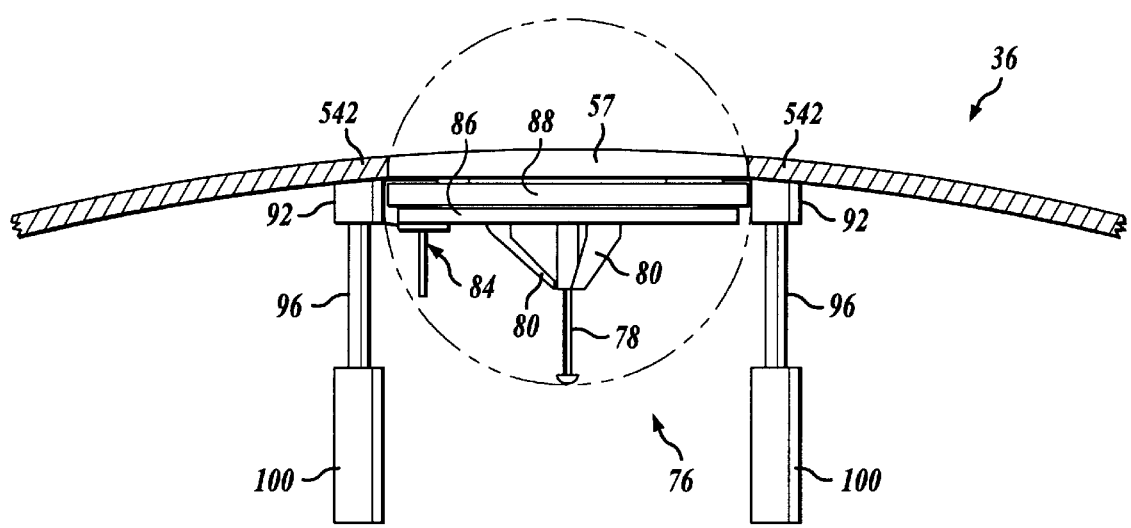
FIG. 3D is a partial cross-section, with portions broken away, illustrating the retractable grapple fixture depicted in FIG. 3A in a retracted position.

In operation, the retractable support arms 96 are retracted in order to disengage wall portion 57 or 88 from adjacent sections of the logistics module. In this position, the retractable grapple fixture 76 rotates about an axis M as shown in FIG. 3C. A 180-degree rotation of the grapple fixture 76 moves the grapple shaft 78 between its outwardly directed extended position and its retracted position, wherein the shaft 78 is entirely contained within the logistics module 36. The retractable support arms 96 may then be extended until the wall portion 57 or 88 forms a generally continuous thermal protective layer with outer wall of the logistics module 36.

Figure 4A:
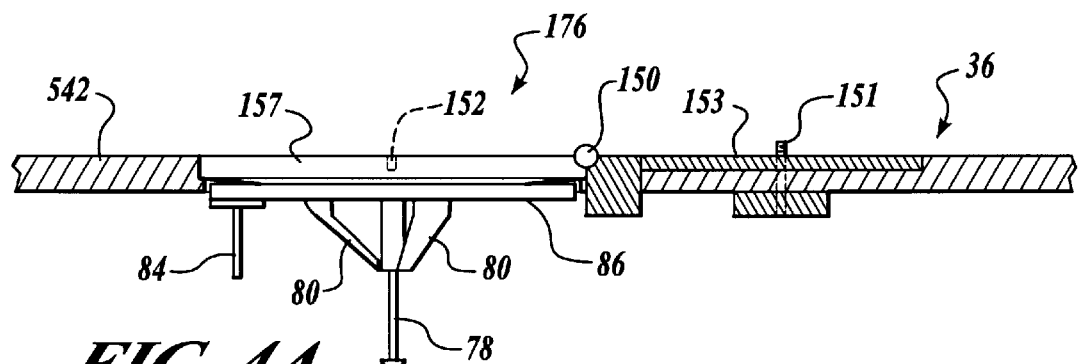
FIG. 4A is a partial cross-section view illustrating a second embodiment of the grapple fixture in-an retracted position.
Figure 4B:
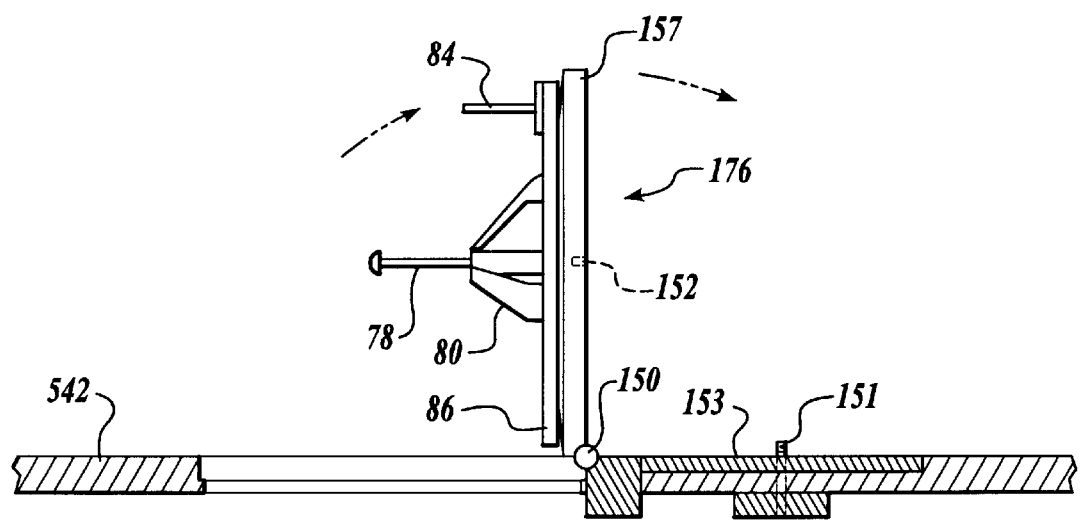
FIG. 4B is a partial cross-section view of the grapple fixture shown in FIG. 4A, showing the grapple fixture in a partially retracted position.
Figure 4C:
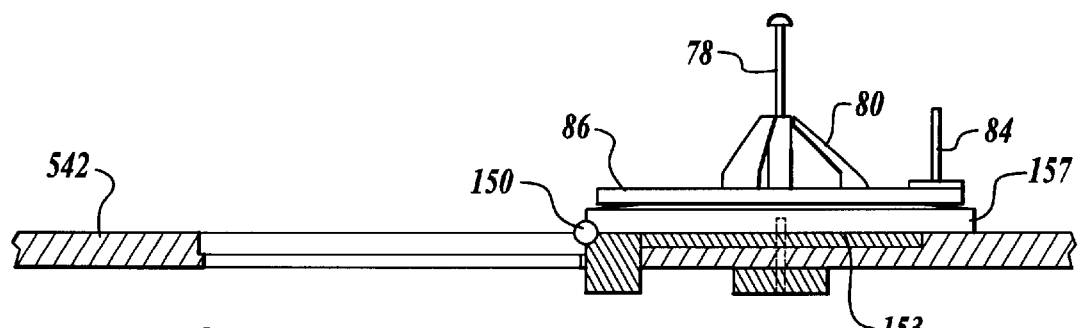
FIG. 4C is a partial cross-section view of the grapple fixture shown in FIG. 4A, showing the grapple fixture in the extended position.

An alternative embodiment for a retractable grapple fixture 176 is shown in FIGS. 4A–4C. In this embodiment, the grapple base plate 86 supporting the grapple shaft 78 and support arms 80 is mounted on a door 157 that is hingedly attached to an outer wall of the logistics module 36, such as the lower cylindrical skirt 542. It will be appreciated that, although a simple hinge 150 is shown in FIG. 4, any number of methods for hingedly connecting a door as is well known in the art, is contemplated by this invention, including by way of nonlimiting example, lever systems that first displace the door outwardly prior to rotating the door. The door is movable between a closed position (FIG. 4A) wherein the grapple fixture 176 is retracted, and an open position (FIG. 4C) wherein the grapple fixture 176 is extended. In the retracted position the grapple shaft 78 is oriented inwardly and contained within the logistics module 36. A remotely operable door extension assembly 150 is provided to move the door 157 between the closed position and the open position. Door latches (not shown) are provided to releasably secure the door 157 in the closed position.

A landing plate 153 is provided near the door 157, positioned to receive the door 157 when it is moved to the open position. At least one motorized lock screw 151 is provided on the landing plate 153 that engages at least one threaded hole 152 in the door 157, such that the can be releasably locked in the open position. It will be appreciated to one of skill in the art that any number of alternative latching/locking mechanisms, such as are well known in the art, could equivalently be provided to secure the door 157 in the open position, including hook and pinion mechanical systems or electromagnetic systems. The important aspect is that the door 157 be held in the open position securely such that the grapple fixture 176 can be externally engaged and manipulated to move the entire orbital vehicle 34 into the desired position.

When access to the grapple fixture 176 is no longer required, for example, when the orbital vehicle 34 is preparing to return to Earth, the latching end effector 75 releases the grapple shaft 78, the motorized lock screws 151 disengage the threaded holes 152, the door extension assembly 150 returns the door 157 to the closed position, and the latches 156 engage the door 157, securing it in the closed position.

FIG. 5 illustrates the logistics module 36 berthed with the space station 73, in position for transferring payload between the logistics module 36 and the space station 73. The coupling between the space station 73 and the logistics module 36 is formed by a passive berthing mechanism 70 associated with logistics module 36, and a complementary active berthing mechanism 71 associated with the space station 73. The coupled berthing mechanisms 70 and 71 provide a path of adequate size and configuration for the transfer of the payload, for example, payload racks 64, between the logistics module 36 and the space station 73.

As seen most clearly in FIGS. 6A–6F, as the orbital vehicle 34 approaches the space station 73, the attitude control system thrusters 72 are used to precisely position the logistics module 36 at a desired position and orientation relative to the space station (FIG. 6A). The remote manipulator system 74 associated with the space station 73 can then secure the grapple shaft 78 (FIG. 6B) and maneuver the orbital vehicle 34 for berthing and unloading. The cover 58 at the forward end of the logistics module 36 is opened and moved laterally providing access to the cargo container 54 (FIG. 6C). The remote manipulator system 74 then moves the orbital vehicle 34 toward the space station 73, to engage the berthing mechanisms 70, 71 (FIG. 6D). After unloading the cargo and optionally loading cargo for return to Earth, the berthing mechanisms 70, 71 disengage, the remote manipulator system moves the orbital vehicle 34 away from the space station 73 (FIG. 6E) and releases the grapple shaft 78, and the attitude control system thrusters 72 are used to provide a safe distance between the logistics module 36 and the space station 73 (FIG. 6F) and to orient the orbital vehicle 34 for igniting the orbital maneuvering system 46 to de-orbit the orbital vehicle 34. The retractable grapple fixture 176 is moved to its retracted position and the cover 58 is moved to its closed position, prior to initiating the de-orbit maneuver.

It will be appreciated that the precise sequence of particular steps may be changed without departing from the present invention. By way of nonlimiting example, the cover 58 may be moved to the closed position prior to releasing the grapple fixture 176.

As previously discussed, the launch vehicle 30 may be used to deliver payload contained within the logistics module 36 to the International Space Station. A typical delivery flight profile of the launch vehicle 30 is illustrated in more detail in FIG. 7. The launch vehicle 30 is launched from launch site 110 and delivers the orbital vehicle 34, including the logistics module 36, to a stage separation altitude 112, for example, approximately 43 km. Stage separation of the orbital vehicle 34 from the launch assist platform 32 occurs at stage separation altitude 112. At this point, the main propulsion engines 40 maneuver the launch assist platform 32 away from the orbital vehicle 34 and the launch assist platform falls back toward the Earth. In a preferred embodiment, at a predetermined altitude, a chute and airbag system is deployed, which allows the launch assist platform 32 to safely return to the Earth's surface for recovery and reuse.

The main propulsion engine 45 of the orbital vehicle 34 is then activated to carry the orbital vehicle 34 and logistics module 36 to an elliptical low Earth main engine cut-off orbit at apogee elevation 113—for example, approximately 94 km. Typically, the OMS 46 will then be used to circularize the orbit. In one embodiment in which cargo is being delivered to the International Space Station 73, the orbital vehicle 34 and logistics module 36 will remain outside the Keep-Out Sphere (KOS) of the International Space Station until cleared for approach. Once cleared for approach, the orbital vehicle 34 executes an injection burn using the OMS engines 46 and/or the attitude control system thrusters 72 to move the orbital vehicle to a coelliptical or phasing orbit 114, perhaps utilizing one or more intermediate phasing orbits 113a. Attitude control system thrusters 72 are then used to navigate the orbital vehicle 34 to a predefined "capture zone" of the space station 73.

After completion of its mission, the orbital vehicle 34 executes a de-orbit burn that slows the orbital vehicle 34 for a ballistic return to Earth at a predetermined landing site. In a preferred embodiment, as the vehicle approaches the Earth a second chute and airbag system (not shown) associated with the orbital vehicle 34 is deployed to allow the orbital vehicle 34 and the logistics module 36 to safely touch down at the landing site, for recovery and reuse.

Many of the components of the logistics module 36 may be recovered, refurbished, and reused for later flights including, but not limited to, the cargo container 54, cover 58, retractable grapple fixture 76, cargo support structure 62, and payload racks 64. In a preferred embodiment of the present invention, each component of the launch vehicle 30 may be used in excess of 100 flights. In one embodiment, the launch vehicle 30 may be used to transport more than 2,500 kg of pressurized cargo to a space station in each flight. Similarly, the logistics module 36 may be used to recover and return to Earth in excess of 900 kg of cargo from the space station. Moreover, the logistics module 36 may provide greater than 30 $m^3$ of storage space for pressurized cargo.

Although the present invention has been described in several preferred embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An aerospace vehicle for delivering a payload into Earth orbit, comprising:
    a launch assist platform having at least one first stage rocket engine;
    an orbital vehicle detachably coupled to the launch assist platform, the orbital vehicle having a propulsion module and a logistics module, wherein the propulsion module includes at least one second stage rocket engine;
    wherein the logistics module further comprises a cylindrical outer wall defining an opening in a distal end of the logistics module, a cargo container disposed at least partially within the cylindrical outer wall, and a cover that is movable between an open position and a closed position, the cover adapted to cover the opening in the distal end of the logistics module when the cover is in the closed position; and
    wherein the logistics module further includes a retractable grapple fixture.

2. The aerospace vehicle of claim 1 wherein the launch assist platform comprises at least three first stage rocket engines, and wherein the first stage rocket engines utilize liquid oxygen and kerosene propellants.

3. The aerospace vehicle of claim 1 wherein the propulsion module further comprises a liquid oxygen tank and a kerosene tank, and wherein the liquid oxygen tank and kerosene tank are fluidly connected to the at least one second stage rocket engine.

4. The aerospace vehicle of claim 1 wherein the orbital vehicle further comprises a cold gas attitude control system.

5. The aerospace vehicle of claim 1 wherein the cargo container has first and second outwardly dome-shaped ends that are connected by a center section to define an enclosed volume.

6. The aerospace vehicle of claim 5 wherein the cargo container first end further comprises a berthing mechanism.

7. The aerospace vehicle of claim 6 wherein the berthing mechanism is a passive Common Berthing Mechanism.

8. The aerospace vehicle of claim 6 wherein the cargo container is adapted to receive a plurality of payload racks.

9. The aerospace vehicle of claim 8 wherein the payload racks are International Standard Payload Racks.

10. The aerospace vehicle of claim 1, wherein the retractable grapple fixture includes an elongate grapple shaft mounted to a support plate, the support plate being pivotable between a retracted position wherein the grapple shaft is inside the cylindrical outer wall, and an extended position wherein the grapple shaft is outside the cylindrical outer wall.

11. The aerospace vehicle of claim 10, wherein the support plate includes a back side, the back side being generally flush with the cylindrical outer wall when the support plate is in the retracted position.

12. The aerospace vehicle of claim 10, further comprising a landing plate that is attached to the cylindrical outer wall and wherein the landing plate receives the support plate when the support plate is in the extended position.

13. The aerospace vehicle of claim 12, further comprising a locking mechanism disposed on the landing plate and adapted to lockingly engage the support plate when the support plate is in the extended position.

14. The aerospace vehicle of claim 13, wherein the locking mechanism is a motorized lock screw.

* * * * *

UNITED STATES PATENT AND TRADEMARK OFFICE
CERTIFICATE OF CORRECTION

PATENT NO.     : 6,513,760 B1
DATED          : February 4, 2003
INVENTOR(S)    : G.E. Mueller et al.

It is certified that error appears in the above-identified patent and that said Letters Patent is hereby corrected as shown below:

<u>Title page,</u>
Item [56], References Cited, OTHER PUBLICATIONS, before "Toru Yoshihara," delete "Mr."; "Experiemtn" should read -- Experimental --; after "Sep. 2000," delete "al" and "Administration.I.*" should read -- Administration.* --

Signed and Sealed this

Twenty-ninth Day of July, 2003

JAMES E. ROGAN
*Director of the United States Patent and Trademark Office*